(12) United States Patent
Lai

(10) Patent No.: US 7,833,064 B1
(45) Date of Patent: Nov. 16, 2010

(54) FOOLPROOF MULTI-CARD CONNECTOR

(75) Inventor: Yaw-Huey Lai, Taipei County (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 12/588,182

(22) Filed: Oct. 7, 2009

(30) Foreign Application Priority Data

Sep. 3, 2009 (TW) .............................. 98216314 U

(51) Int. Cl.
*H01R 24/00* (2006.01)
(52) U.S. Cl. ...................................... 439/630
(58) Field of Classification Search ................ 438/630, 438/637, 946, 326, 631, 634, 635, 633; 361/685; 235/486
See application file for complete search history.

(56) References Cited

U.S. PATENT DOCUMENTS

| | | | |
|---|---|---|---|
| 6,863,571 B2 * | 3/2005 | Sato et al. | 439/630 |
| 6,974,350 B1 * | 12/2005 | Chen | 439/630 |
| 7,011,549 B1 * | 3/2006 | Lai | 439/630 |
| 7,044,757 B1 * | 5/2006 | Yen | 439/138 |
| 7,448,912 B1 | 11/2008 | Shiue et al. | |
| 7,731,538 B2 * | 6/2010 | Kiryu et al. | 439/630 |
| 2006/0276082 A1 * | 12/2006 | Hung et al. | 439/630 |
| 2007/0218770 A1 * | 9/2007 | Kikuchi et al. | 439/630 |

* cited by examiner

*Primary Examiner*—T C Patel
*Assistant Examiner*—Harshad C Patel
(74) *Attorney, Agent, or Firm*—Bacon & Thomas, PLLC

(57) ABSTRACT

A foolproof multi-card connector includes a housing having two sliding grooves bilaterally arranged on the inside, multiple sets of metal terminals, a movable partition board, which has two pivots respectively inserted into the sliding grooves and movable vertically in the sliding grooves, the movable partition board having two guide blocks bilaterally disposed at the front side each guide block having a bottom guide face and an inner guide face, a hook member mounted in the housing and hooked on the movable partition board to prohibit backward displacement of the movable partition board, and spring members supported between the bottom wall of the housing and the bottom wall of the movable partition board to hold the movable partition board in a rear up and front down position. Based on this arrangement, the foolproof multi-card connector prevents erroneous insertion of a card member and prohibits insertion of a second card member after insertion of one first card member.

11 Claims, 20 Drawing Sheets

US 7,833,064 B1

FOOLPROOF MULTI-CARD CONNECTOR

BACKGROUND OF THE INVENTION

1. Field of the Invention

The present invention relates to a card connector for reading an electronic memory card and more particularly, to a foolproof multi-card connector, which prevents erroneous insertion of a card member and prohibits insertion of a second card member after insertion of one first card member.

2. Description of the Related Art

U.S. Pat. No. 7,448,912 discloses a multi-in-one card connector issued to the present inventor, which comprises a base having two upright sidewalls and a downwardly backwardly extending sloping groove at each upright sidewall, and two slanting, two terminal sets mounted in the base at different elevations, a partition plate mounted in the base and movable along the downwardly backwardly extending sloping grooves of the upright sidewalls between two positions to control insertion of only one single card member into contact with one terminal set in the base, a cover plate covering the base, and two spring members connected between the base and the partition plate to support the partition plate in one of the two positions. This design prohibits insertion of a second card member after insertion of one first card member and prevents an error during insertion of a card member.

According to commercial memory cards, a MS-Duo has a width and thickness relatively smaller than a SD card. The aforesaid prior art design of the present inventor achieves the function of prohibiting insertion of a second card member after insertion of one first card member. However, the aforesaid prior art design does not provide means to guide insertion of a MS-Duo card, i.e., it cannot prohibit insertion of a MS-Duo card after insertion of a SD card.

SUMMARY OF THE INVENTION

The present invention has been accomplished under the circumstances in view. It is the main object of the present invention to provide a foolproof multi-card connector, which prevents erroneous insertion of a card member and prohibits insertion of a second card member after insertion of one first card member.

To achieve this and other objects of the present invention, a foolproof multi-card connector comprises a housing, which comprises an insertion hole defined at a front side thereof, an internal card-insertion chamber in communication with the insertion hole and a sliding groove located on each of two opposite sidewalls of the internal card-insertion chamber, at least two sets of metal terminals mounted in the housing and projecting into the internal card-insertion chamber, a movable partition board movably mounted in the internal card-insertion chamber of the housing to divide the internal card-insertion chamber into two vertically spaced spaces, the movable partition board comprising two pivots respectively extended from two opposite lateral sides thereof on the middle and respectively inserted into the sliding grooves of the housing and movable up and down relative to the sliding grooves for enabling the movable partition board to be biased relative to the housing and two guide blocks respectively disposed at a front side of each of two opposite lateral sides thereof, each guide block comprising a bottom guide face disposed at a bottom side thereof and sloping upwardly forwards and an inner guide face disposed an inner side and sloping outwardly forwards, a hook member mounted inside the housing and hooked on the movable partition board to prohibit backward displacement along the sliding grooves, and at least one spring member mounted in the housing and supported between the inside bottom wall of the housing and the bottom side of the rear part of the movable partition board to hold the movable partition board in a rear up and front down position. Based on the aforesaid arrangement, the foolproof multi-card connector prevents erroneous insertion of a card member and prohibits insertion of a second card member after insertion of one first card member.

DETAILED DESCRIPTION OF THE INVENTION

Figure 1:
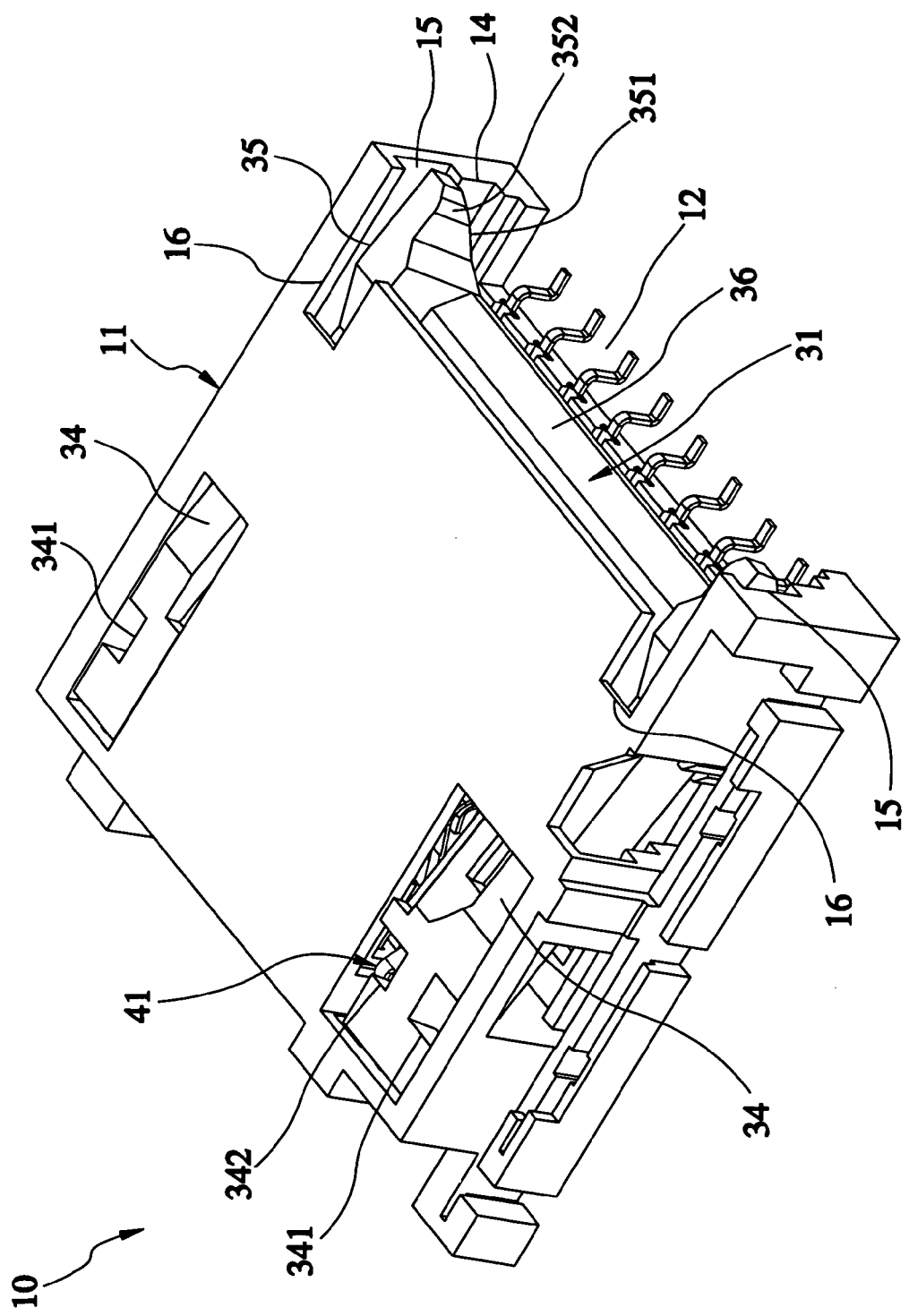
FIG. 1 is an elevational view of a foolproof multi-card connector in accordance with a first embodiment of the present invention.
Figure 2:
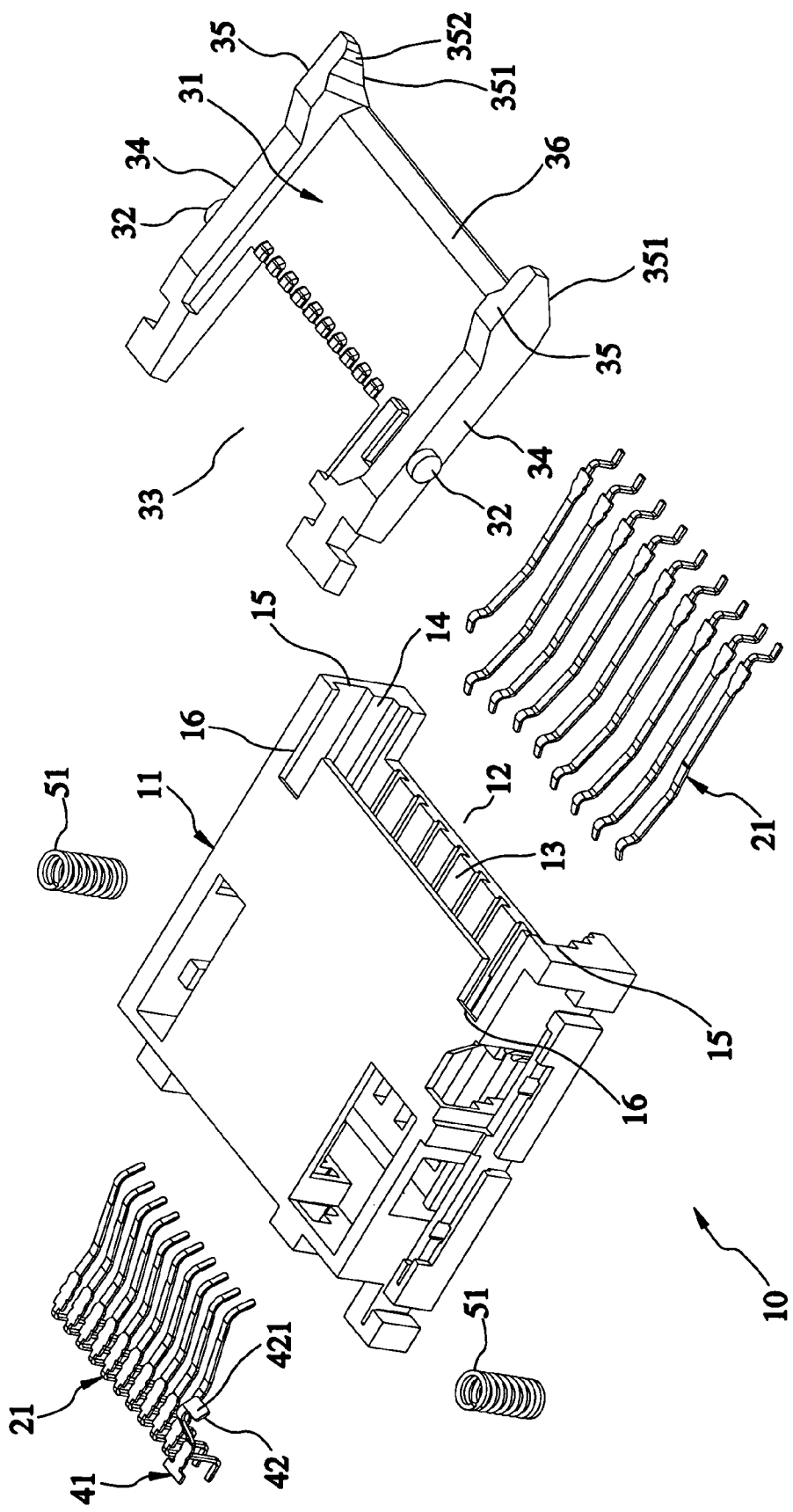
FIG. 2 is an exploded view of the foolproof multi-card connector in accordance with the first embodiment of the present invention.
Figure 3:
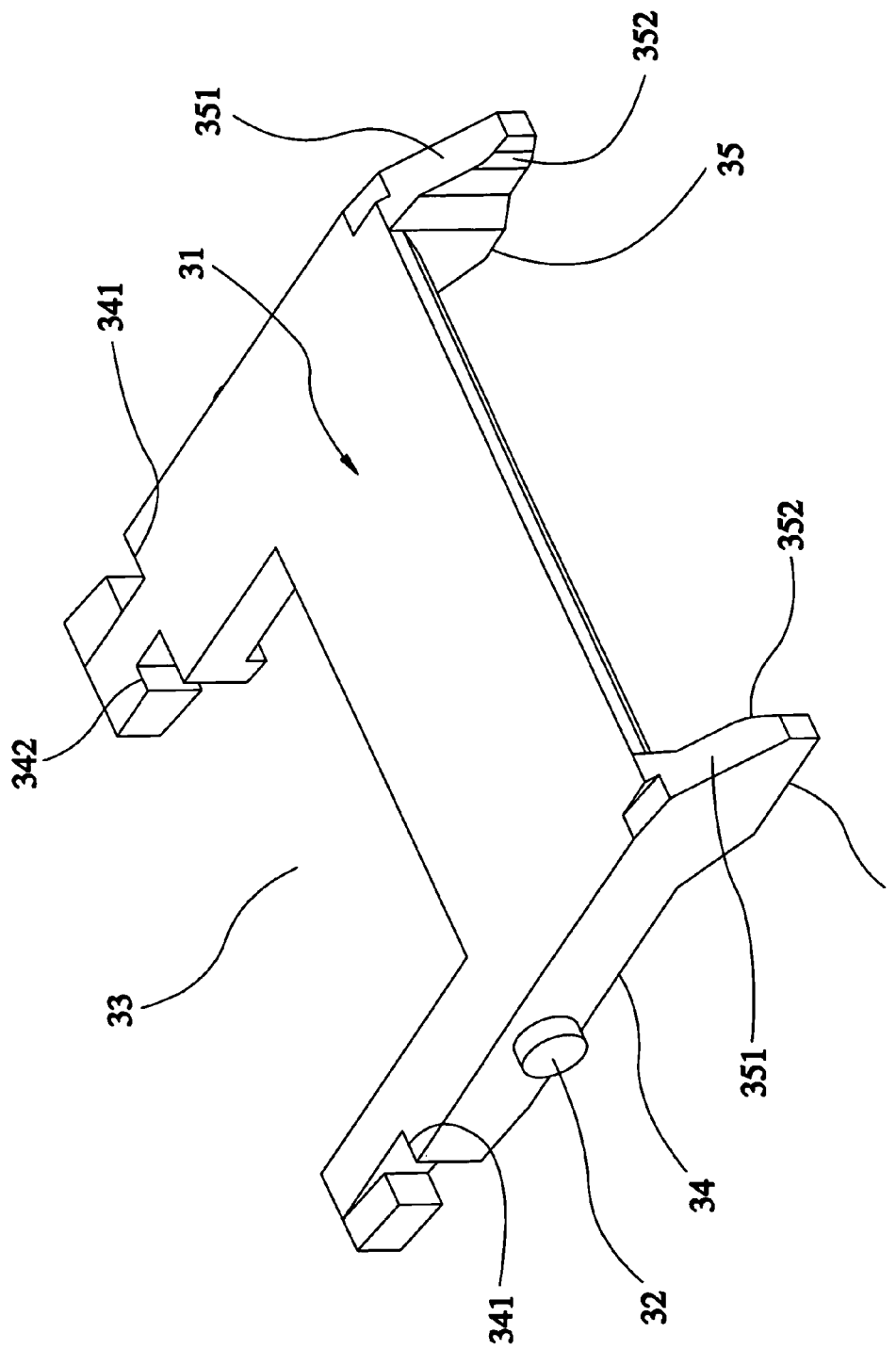
FIG. 3 is an elevational view of the movable partition board of the foolproof multi-card connector in accordance with the first embodiment of the present invention.
Figure 4:
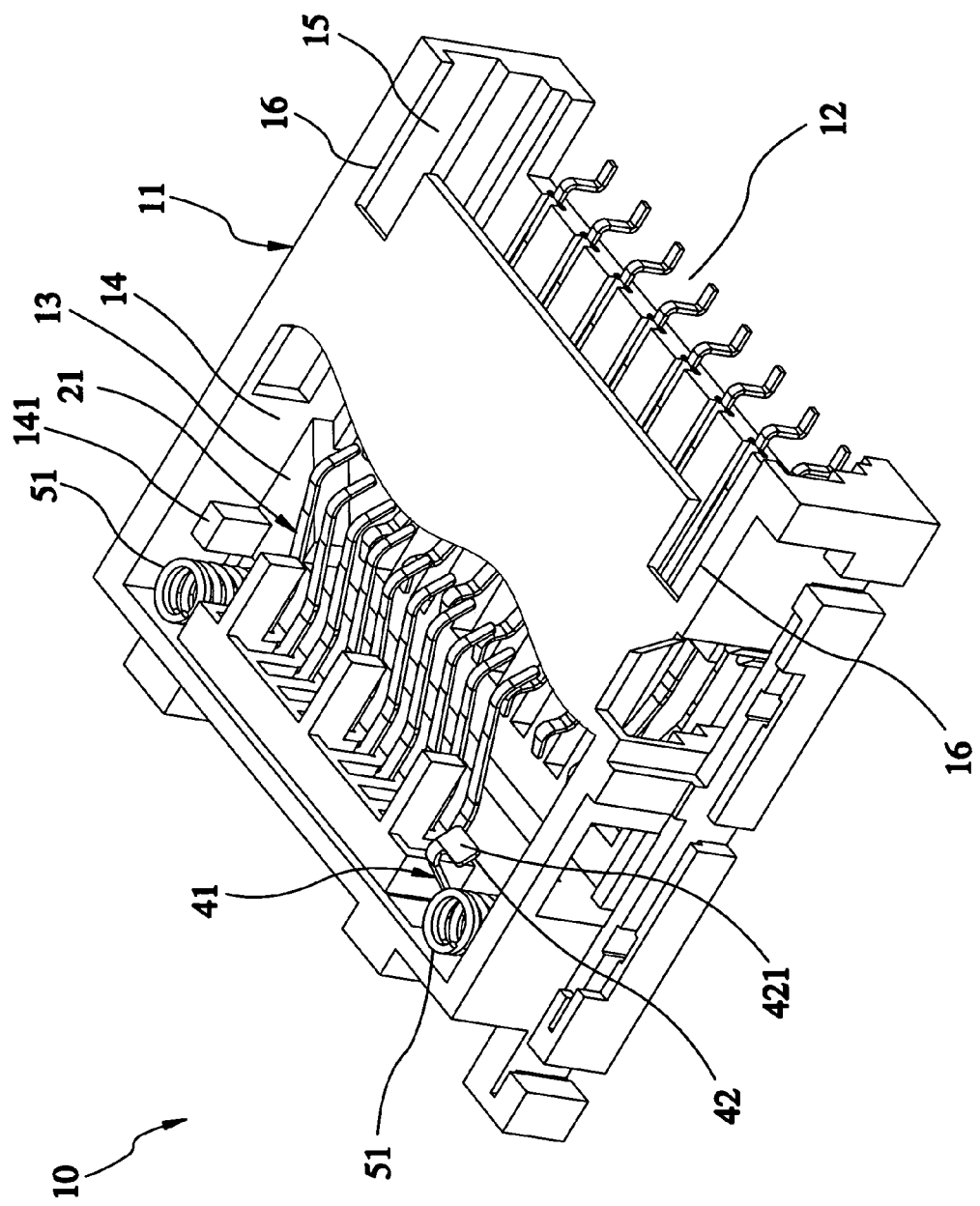
FIG. 4 is a cutaway view of the first embodiment of the present invention, showing the assembly status of the foolproof multi-card connector before insertion of the movable partition board in the housing.

Referring to FIGS. 1-6, a foolproof multi-card connector 10 in accordance with a first embodiment of the present invention is shown comprising a housing 11, two sets of metal terminals 21, a movable partition board 31, a hook member 41 and two spring members 51.

The housing 11 comprises an insertion hole 12 defined at the front side, an internal card-insertion chamber 13 in communication with the insertion hole 12, a sliding groove 15 located on each of two sidewalls 14 of the internal card-insertion chamber 13 and extending in direction from the front side toward the rear side and ended on the middle of the housing 11, a locating rib 141 protruded from each of the two sidewalls 14 near the rear side and spaced from the top wall of the internal card-insertion chamber 13 at a predetermined distance, and two top openings 16 bilaterally disposed at an upper side of the front side of the shell 11.

The two sets of metal terminals 21 are mounted in the housing 11 at two different elevations and projecting to the internal card-insertion chamber 13.

The movable partition board 31 comprises a pivot 32 perpendicularly extended from the middle of each of the two opposite lateral sides thereof and respectively inserted into the sliding grooves 15 to the inside of the internal card-insertion chamber 13 where the two pivots 32 are vertically movable with the movable partition board 31 relative to the sliding grooves 15. The movable partition board 31 divides the internal card-insertion chamber 13 into two vertically spaced spaces. By means of supporting the pivots 32 in the sliding grooves 15, the movable partition board 31 can be moved up and down like the function of a seesaw. The space above the movable partition board 31 is adapted for receiving a MS-Duo card. The space below the movable partition board 31 is adapted for receiving a SD card. The movable partition board 31 has an opening 33 on the middle of the rear side. The two sets of metal terminals 21 are set corresponding to the opening 33 so that biasing the movable partition board 31 does not interfere with the two sets of metal terminals 21.

The movable partition board 31 comprises an actuation arm 34 at each of the two opposite lateral sides thereof. The top edge of each of the two actuation arms 34 is disposed above the elevation of the top wall of the movable partition board 31. Each actuation arm 34 has a front end terminating in a guide block 35. The top edge of the guide block 35 is above the elevation of the top edge of the respective actuation arm 34. The guide block 35 of each actuation arm 34 has a bottom guide face 351 sloping upwardly forwards, and an inner guide face 352 sloping outwardly forwards. The movable partition board 31 has a transverse guide face 36 sloping downwardly forwards. When the movable partition board 31 is held in the position where the rear side is turned downwards and the front side is turned upwards, the top edges of the actuation arms 34 are attached to the inside top wall of the housing 11, and the guide blocks 35 of the actuation arms 34 extend through the two top openings 16 to the outside of the housing 11.

Further, each of the two actuation arms 34 has a locating groove 341 on the outer side of the rear end. When inserting the movable partition board 31 from the front side into the inside of the housing 11, the movable partition board 31 kept in the position of rear side up and front side down. At this time, the rear ends of the two actuation arms 34 can pass over the locating ribs 141 to have the respective locating grooves 341 be respectively coupled to the respective locating ribs 141. Further, one of the two actuation arms 34 has a hook hole 342.

The hook member 41 is mounted in the housing 11 and hooked on the movable partition board 31 to prohibit outward displacement of the movable partition board 31 along the sliding grooves 15. According to this embodiment, the hook member 41 is a leaf spring affixed to the rear side inside the housing 11, having a front end terminating in a hook portion 42 for hooking in the hook hole 342 of one actuation arm 34 of the movable partition board 31. The hook portion 42 has a face 421 sloping downwardly forwards.

During installation, the movable partition board 31 is kept in the position of rear side up and front side down and then inserted into the internal card-insertion chamber 13. When the actuation arm 34 having the said hook hole 342 is moved into the rear side inside the housing 11, the rear end edge of the actuation arm 34 having the said hook hole 342 will be stopped against the face 421 of the hook portion 42 to force the hook portion 42 downwards, allowing the actuation arm 34 to pass. When the movable partition board 31 entered the inside of the housing 11, the hook hole 342 is kept in alignment with the hook portion 42, and the hook portion 42 is immediately forced by the spring power of the hook member 41 to hook in the hook hole 342, prohibiting the movable partition board 31 from moving out of the housing 11.

The two spring members 51 according to this embodiment are compression springs bilaterally supported between the inside bottom wall of the housing 11 and the bottom wall of the rear side of the movable partition board 31, holding the movable partition board 31 in a rear up and front down position.

The operation of the first embodiment is outlined hereinafter.

Figure 5:
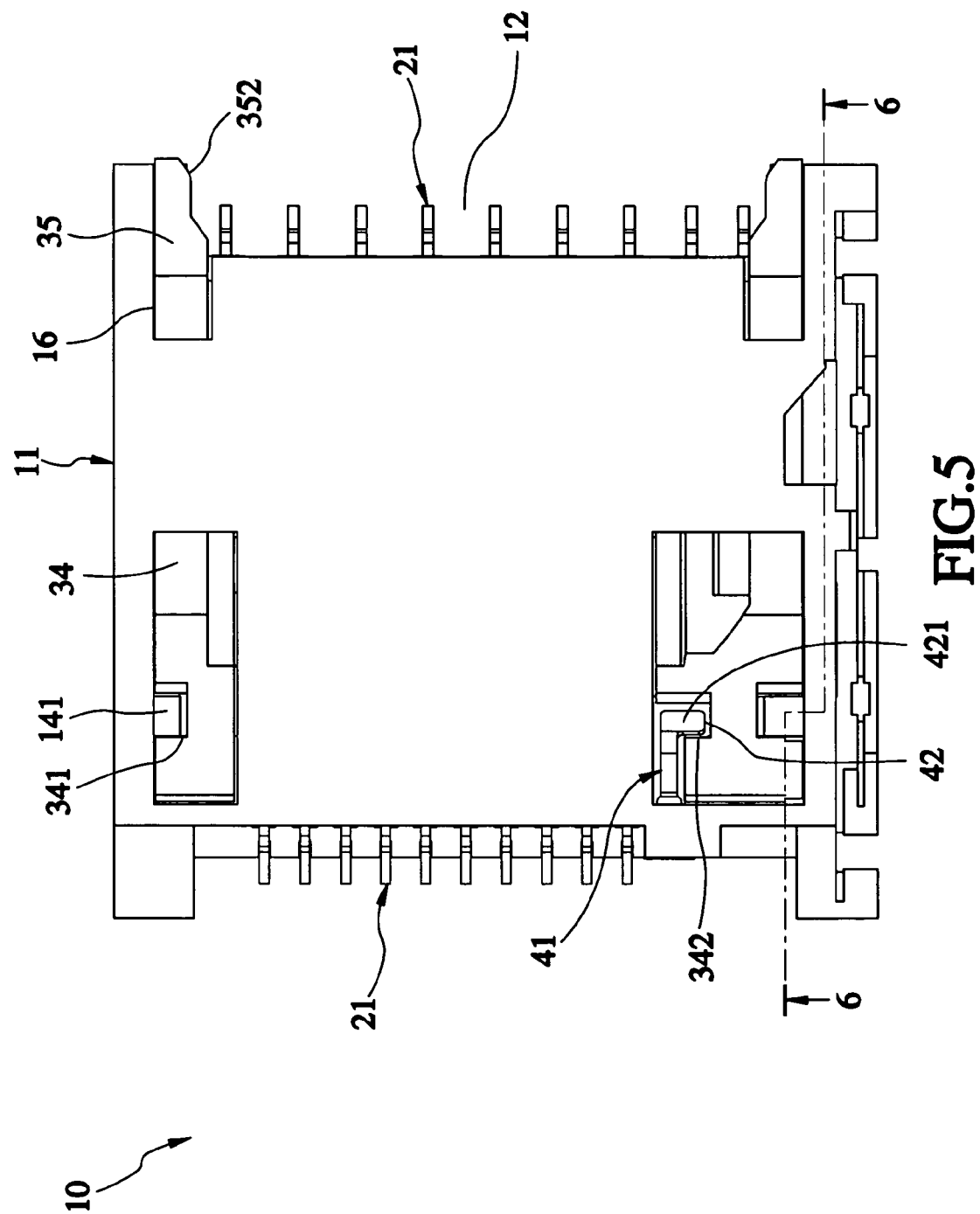
FIG. 5 is a top view of foolproof multi-card connector in accordance with the first embodiment of the present invention.
Figure 6:
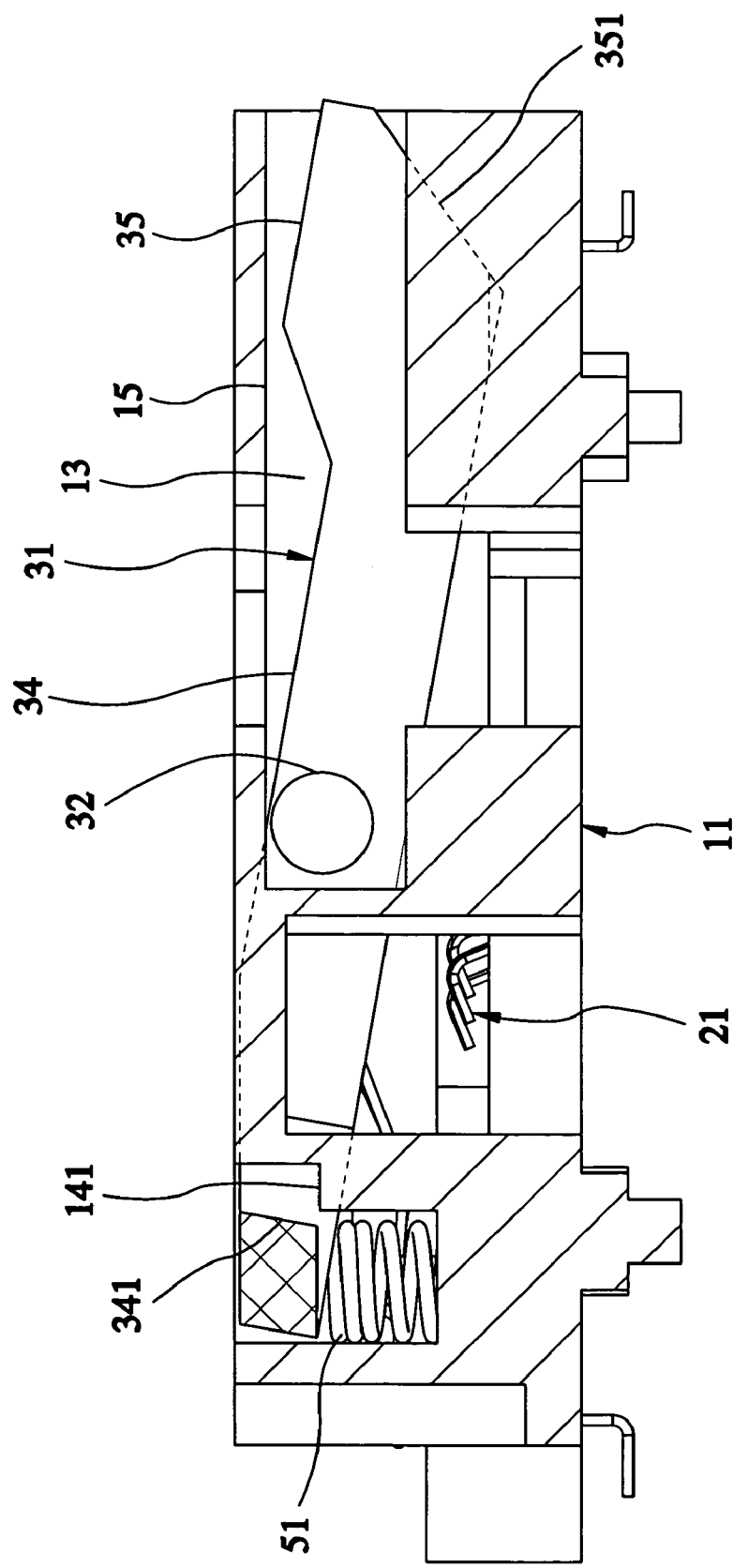
FIG. 6 is a sectional view taken along line 6-6 of FIG. 5.

As shown in FIGS. 5 and 6, before insertion of a card, the two actuation arms 34 of the movable partition board 31 are held in the rear up and front down position subject to the effect of the spring members 51, and the two pivots 32 are kept in the top side inside the sliding grooves 15. At this time, the hook portion 42 is hooked in the hook hole 342, prohibiting the movable partition board 31 from backward displacement.

Figure 7:
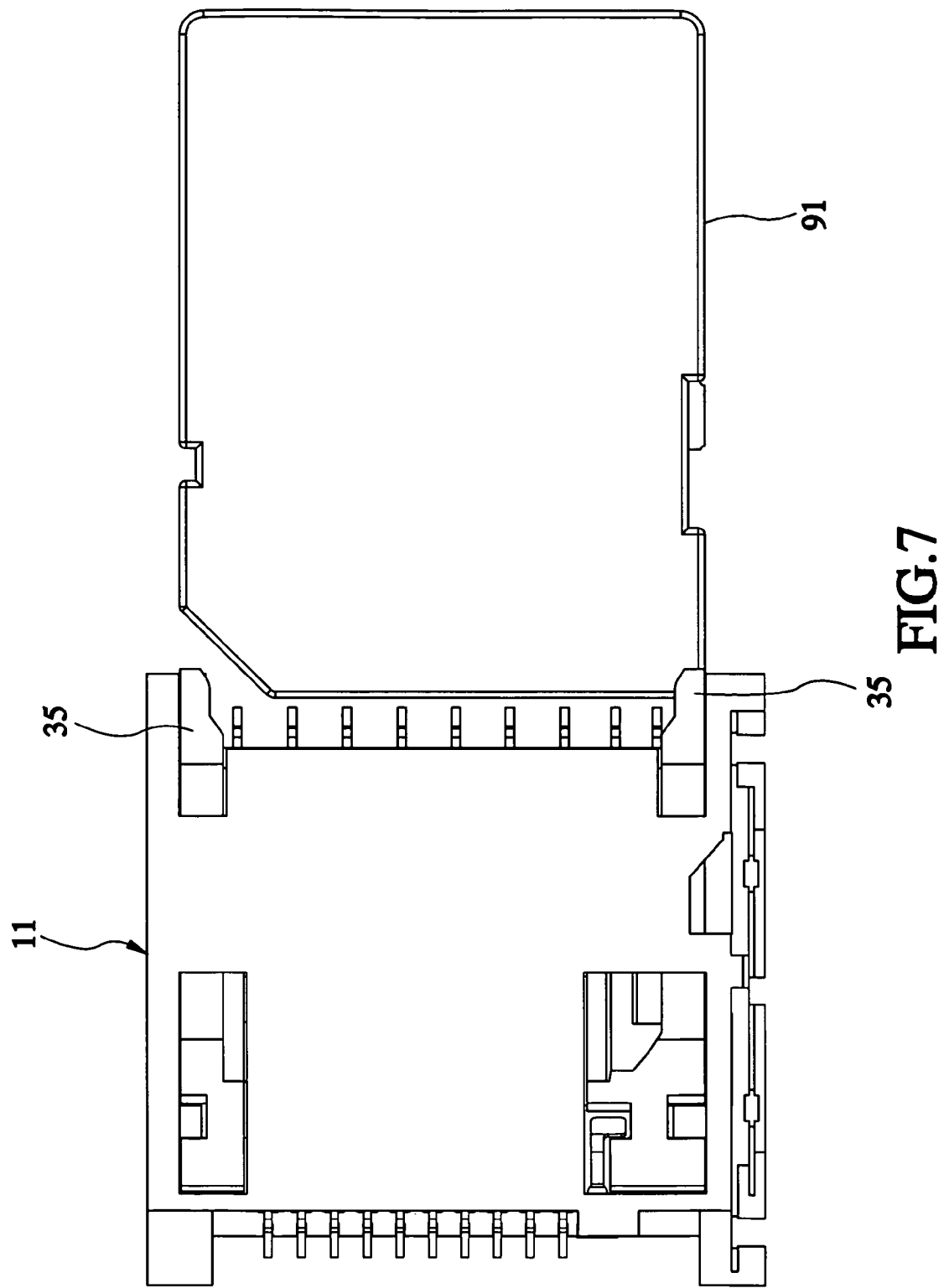
FIG. 7 is a schematic top view of the first embodiment of the present invention, showing the status of the insertion of a SD card.
Figure 8:
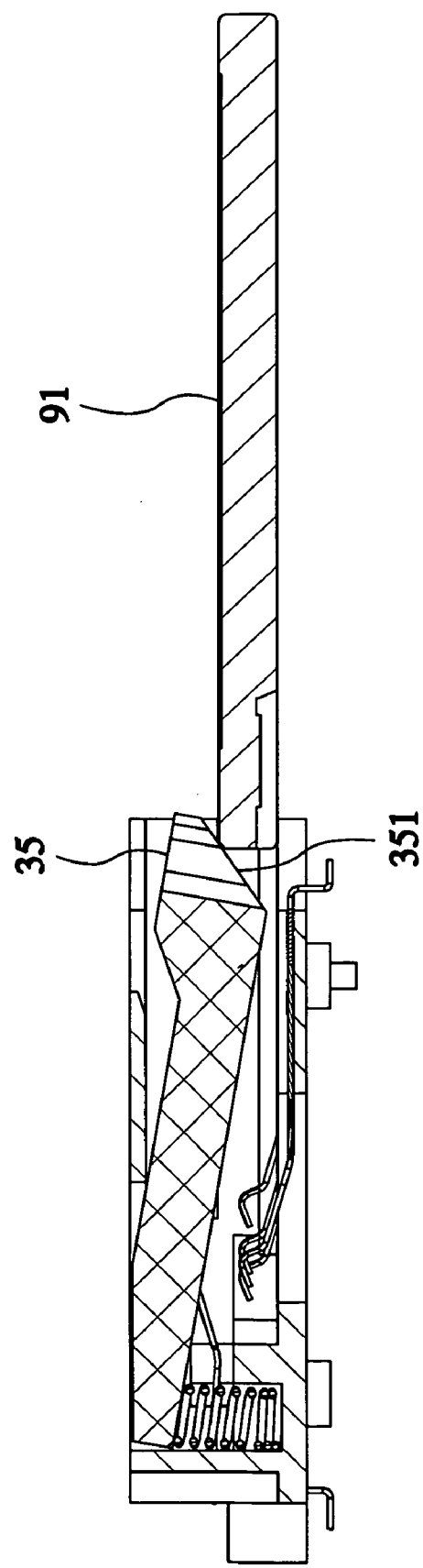
FIG. 8 corresponds to FIG. 7, showing the SD card touched the movable partition board.
Figure 9:
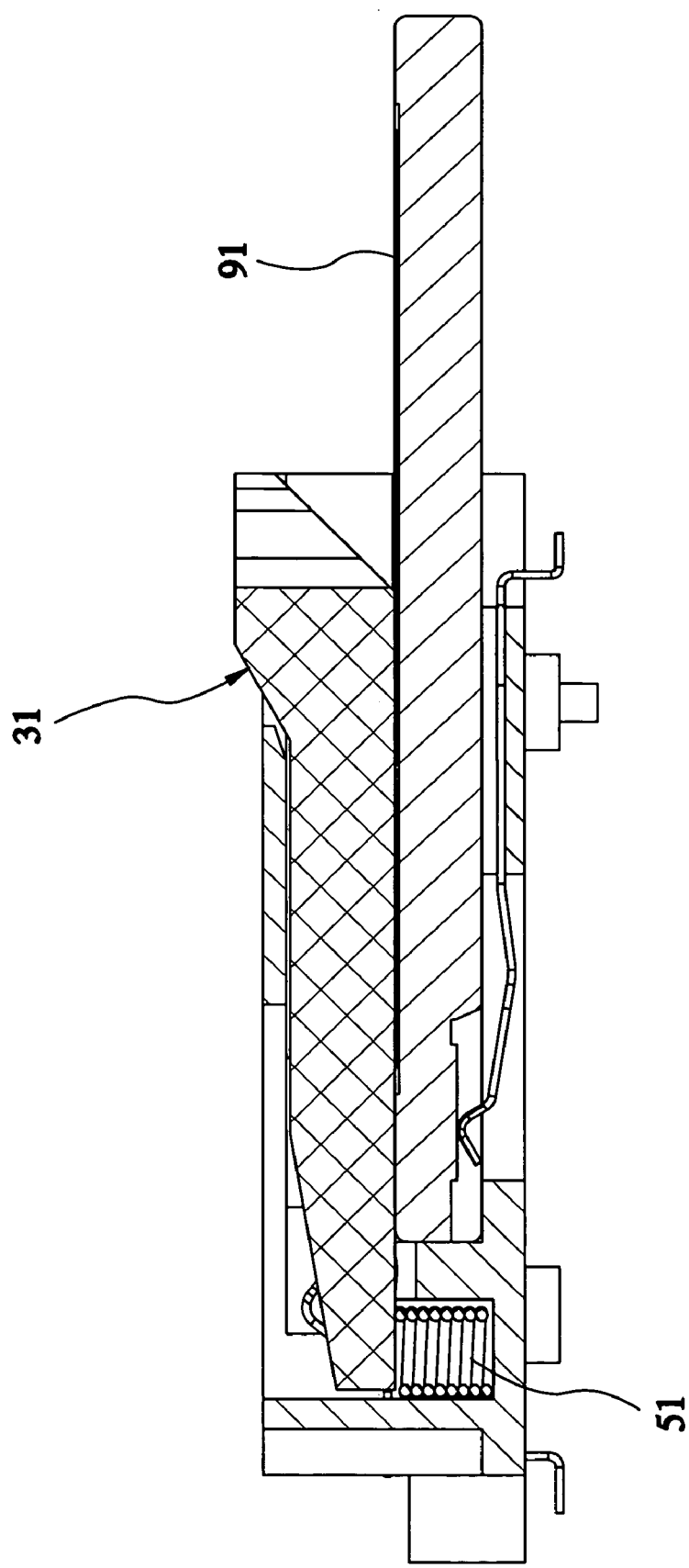
FIG. 9 corresponds to FIG. 8, showing the SD card inserted into the inside of the foolproof multi-card connector.
Figure 10:
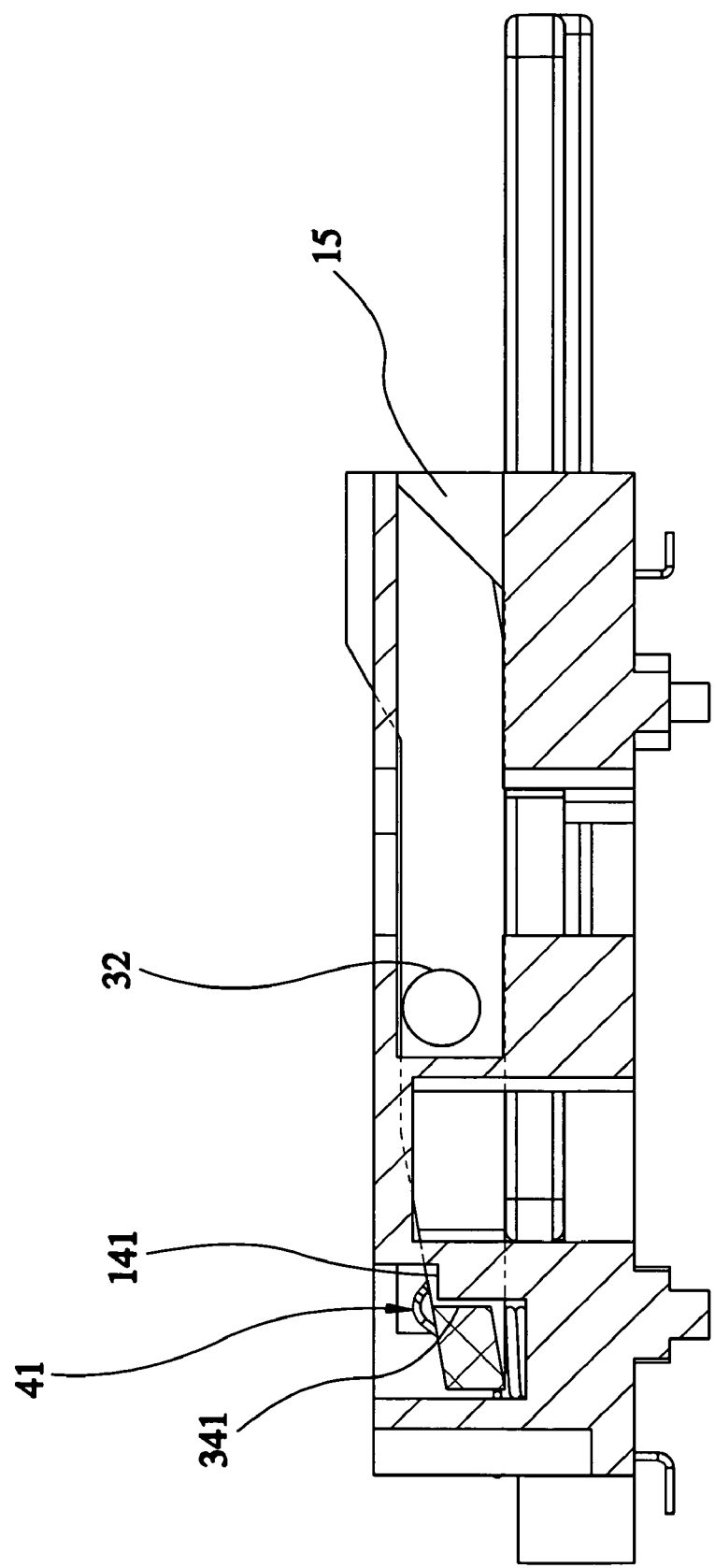
FIG. 10 is a schematic sectional view of the first embodiment of the present invention, showing the position of the pivots of the movable partition board kept in the respective sliding grooves after insertion of a SD card.

When inserting a SD card 91 into the housing 11, as shown in FIGS. 7 and 8, because the width of a SD card 91 is longer than a MS-Duo card 92, the front edge of the SD card 91 will be stopped against the bottom guide faces 351 of the guide blocks 35 of the two actuation arms 34. When keep inserting the SD card 91 forwards, the SD card 91 will lift the guide blocks 35 and the movable partition board 31 and then enter the space in the housing 11 beneath the movable partition board 31. Therefore, the SD card 91 will not be inserted into the space above the movable partition board 31 erroneously. When keep forcing the SD card 91 forwards, as shown in FIG. 9, the movable partition board 31 will be reversed from the tilted status to horizontal, allowing the SD card 91 to be set into the rear limit position to compress the spring members 51. At this time, as shown in FIG. 10, the two pivots 32 are disposed in the top side in the sliding grooves 15, the hook hole 342 (see FIG. 4) is disengaged from the hook portion 42, and the locating grooves 341 are respectively coupled to the respective locating ribs 141, prohibiting the movable partition board 31 from falling out of the housing 11. After insertion of the SD card 91 into the foolproof multi-card connector, the front edge of the movable partition board 31 is held in the top side inside the housing 11. At this time, the space in the housing 11 above the movable partition board 31 is insufficient for the insertion of a MS-Duo card 92 (see FIG. 11). When a user inserts a MS-Duo card 92 into the foolproof multi-card connector at this time, the MS-Duo card 92 will be stopped by the front edge of the movable partition board 31. Therefore, the foolproof multi-card connector prohibits insertion of a second card member after insertion of one first card member.

When wishing to remove the inserted SD card 91, the user can directly pull the SD card 91 out of the housing 11. After removal of the SD card 91, the movable partition board 31 is immediately returned to the position before insertion of a card.

When a user is inserting a SD card 91 into the space above the movable partition board 31, the SD card 91 will be stopped by the guide blocks 35 of the movable partition board 31, avoiding an error.

Figure 11:
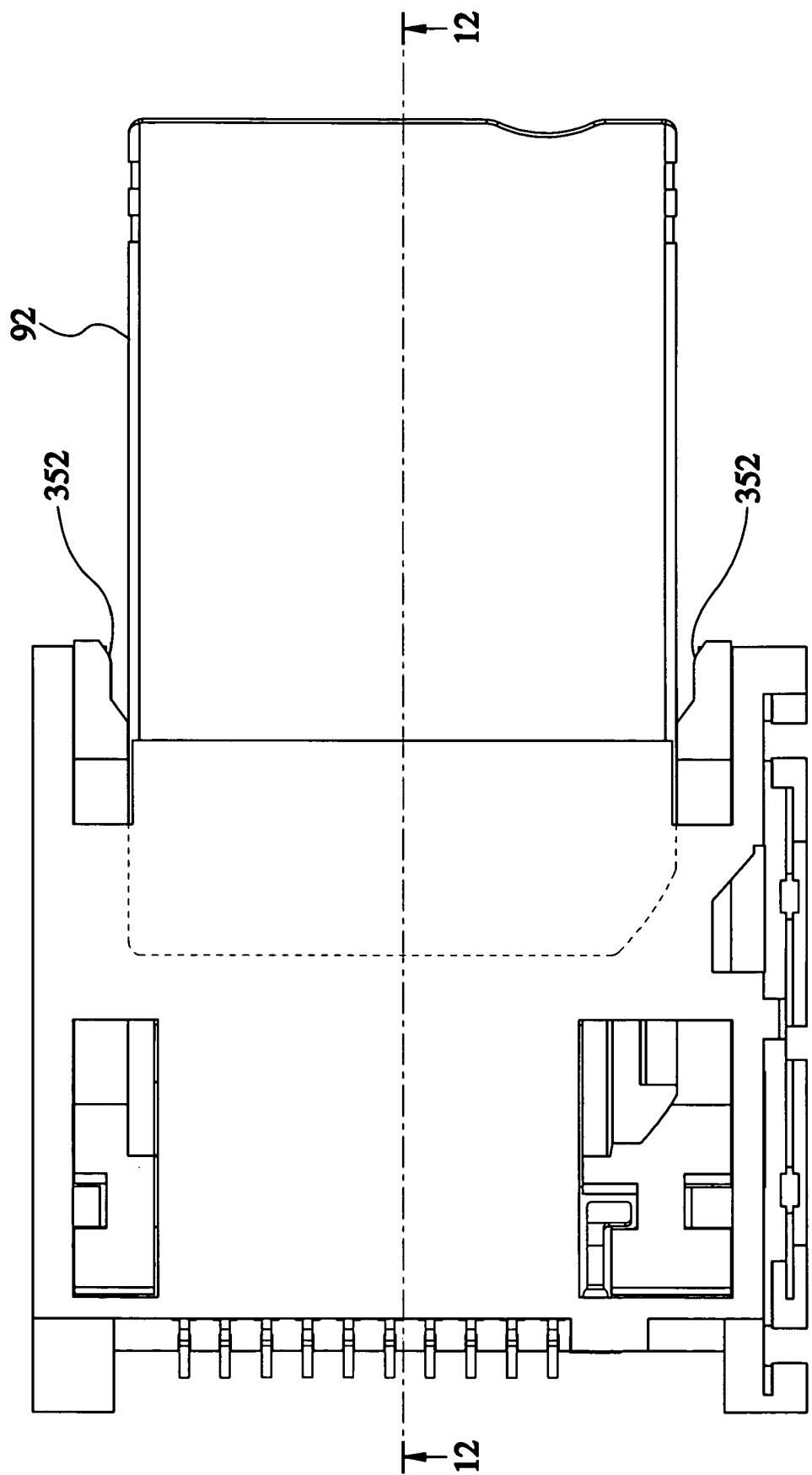
FIG. 11 is a schematic top view of the first embodiment of the present invention, showing the status of the insertion of a MS-Duo card.
Figure 12:
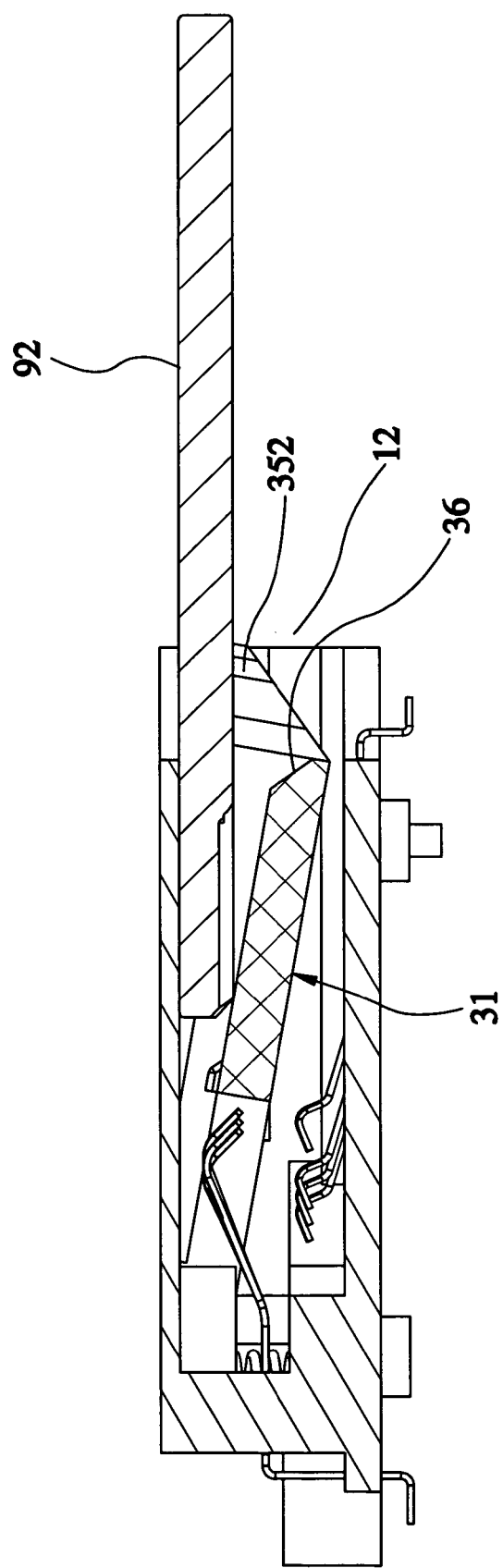
FIG. 12 is a sectional view taken along line 12-12 of FIG. 11.
Figure 13:
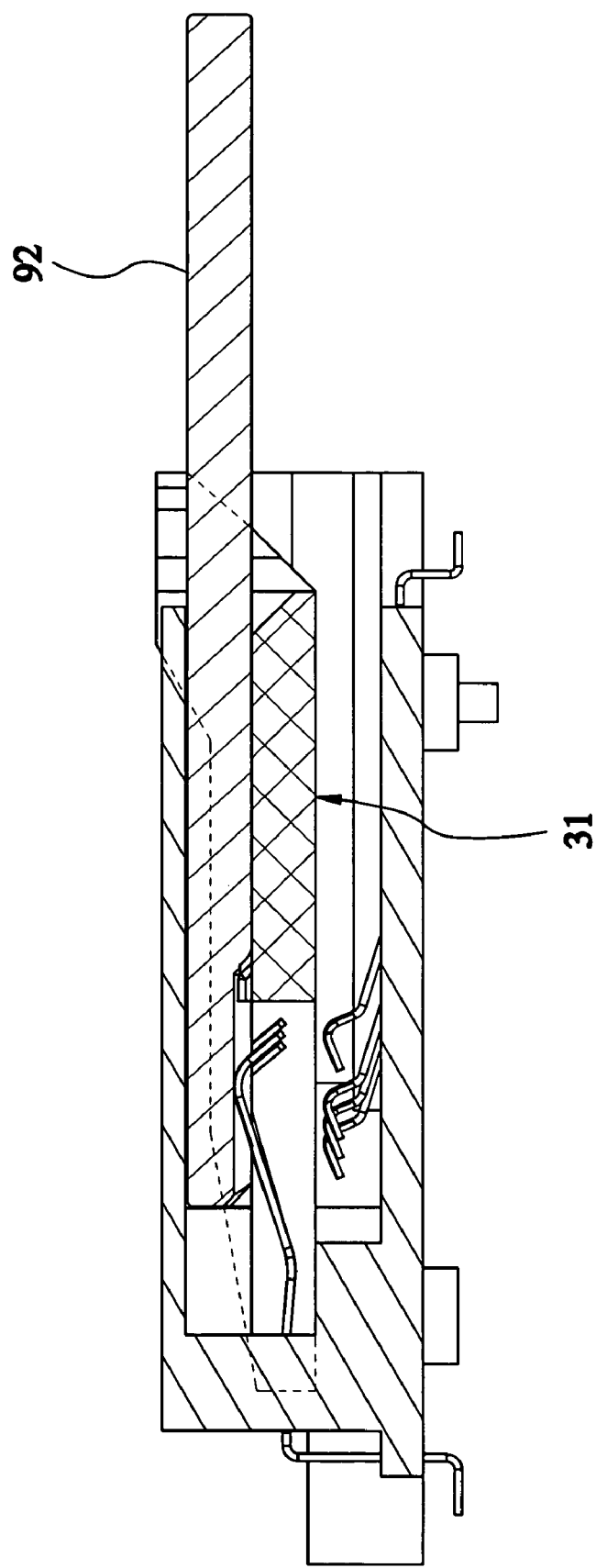
FIG. 13 corresponds to FIG. 12, showing the MS-duo card fully inserted into the foolproof multi-card connector.
Figure 14:
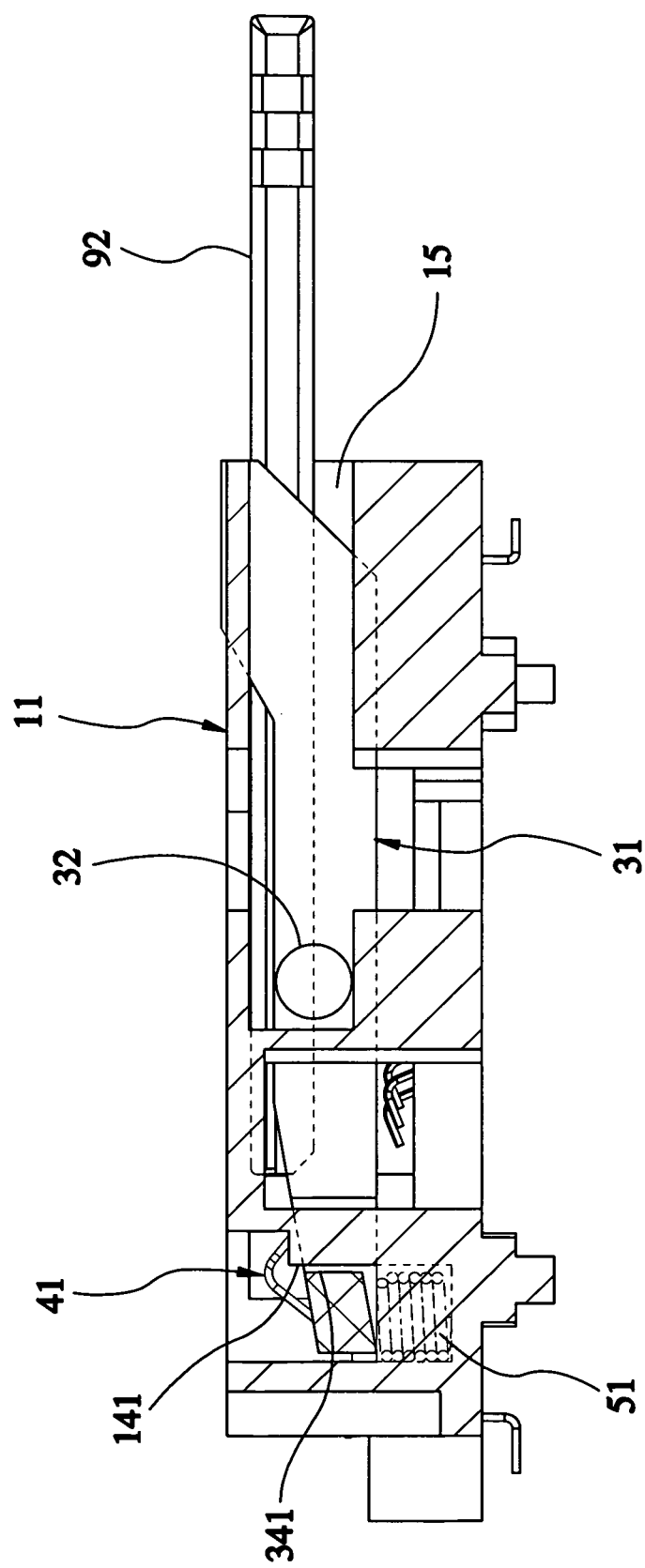
FIG. 14 is a schematic sectional view of the first embodiment of the present invention, showing the positioning of the pivots of the movable partition board in the respective sliding grooves after insertion of a MS-Duo card.
Figure 15:
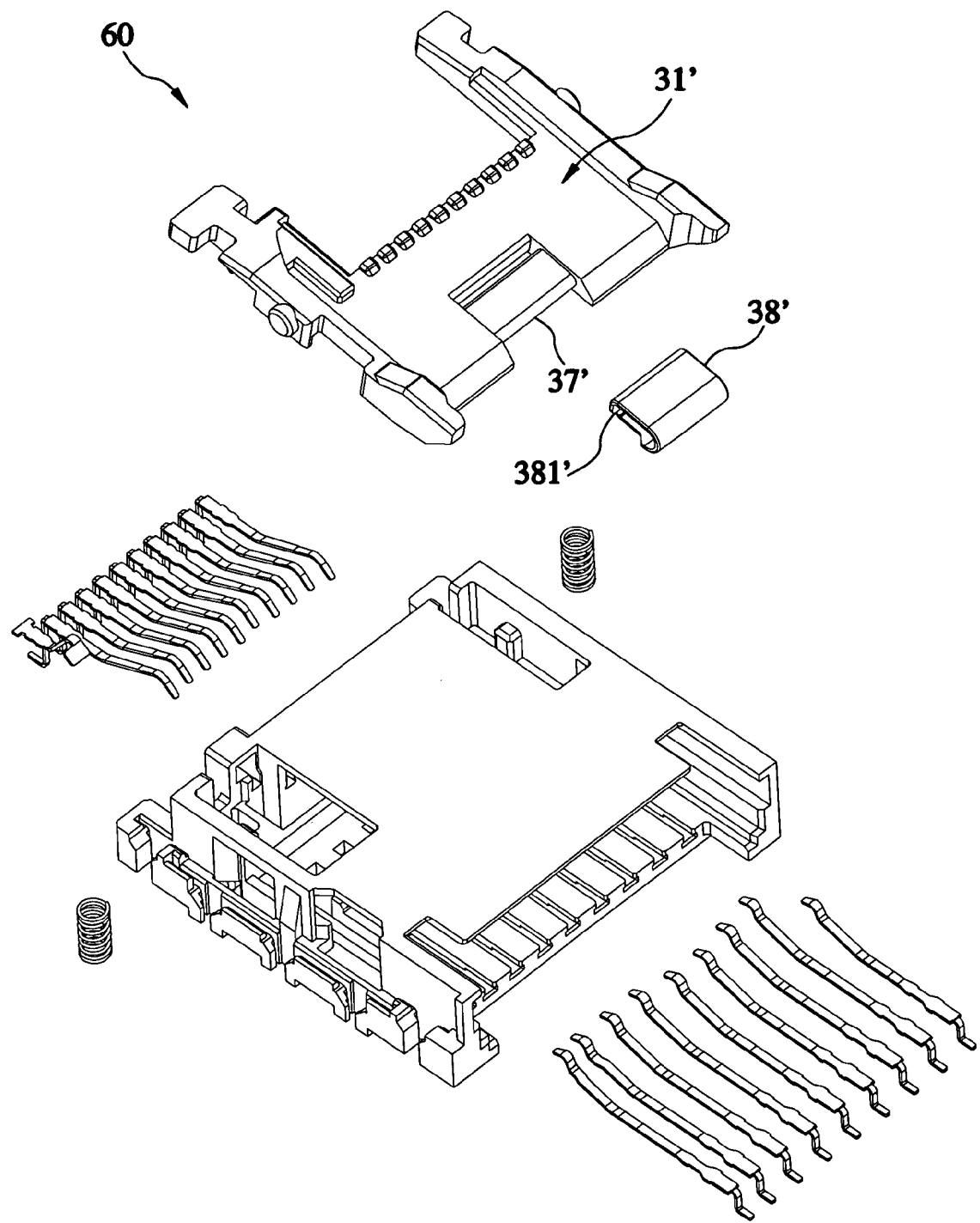
FIG. 15 is an exploded view of a foolproof multi-card connector in accordance with a second embodiment of the present invention.
Figure 16:
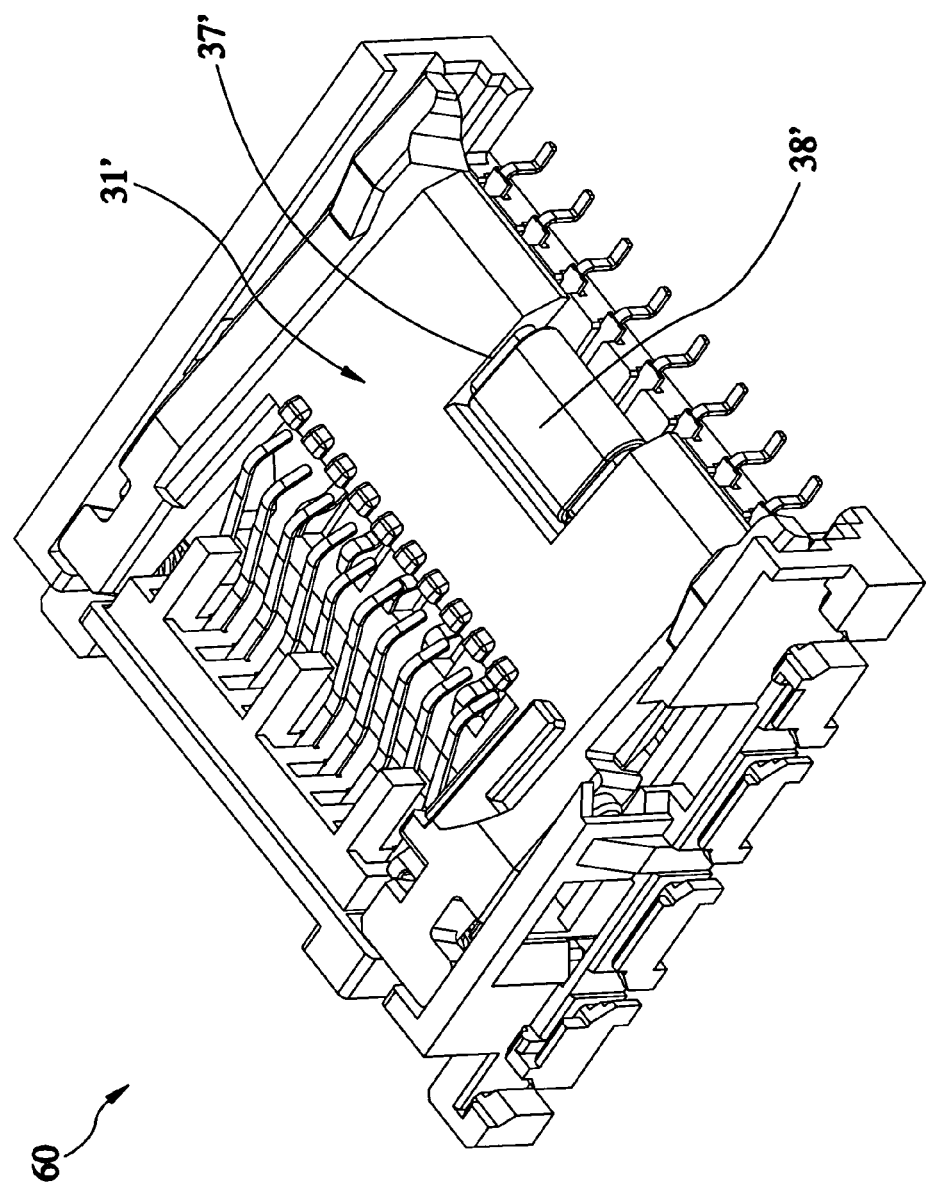
FIG. 16 is an elevational assembly view of the second embodiment of the present invention, showing the internal arrangement of the foolproof multi-card connector in the housing.
Figure 17:
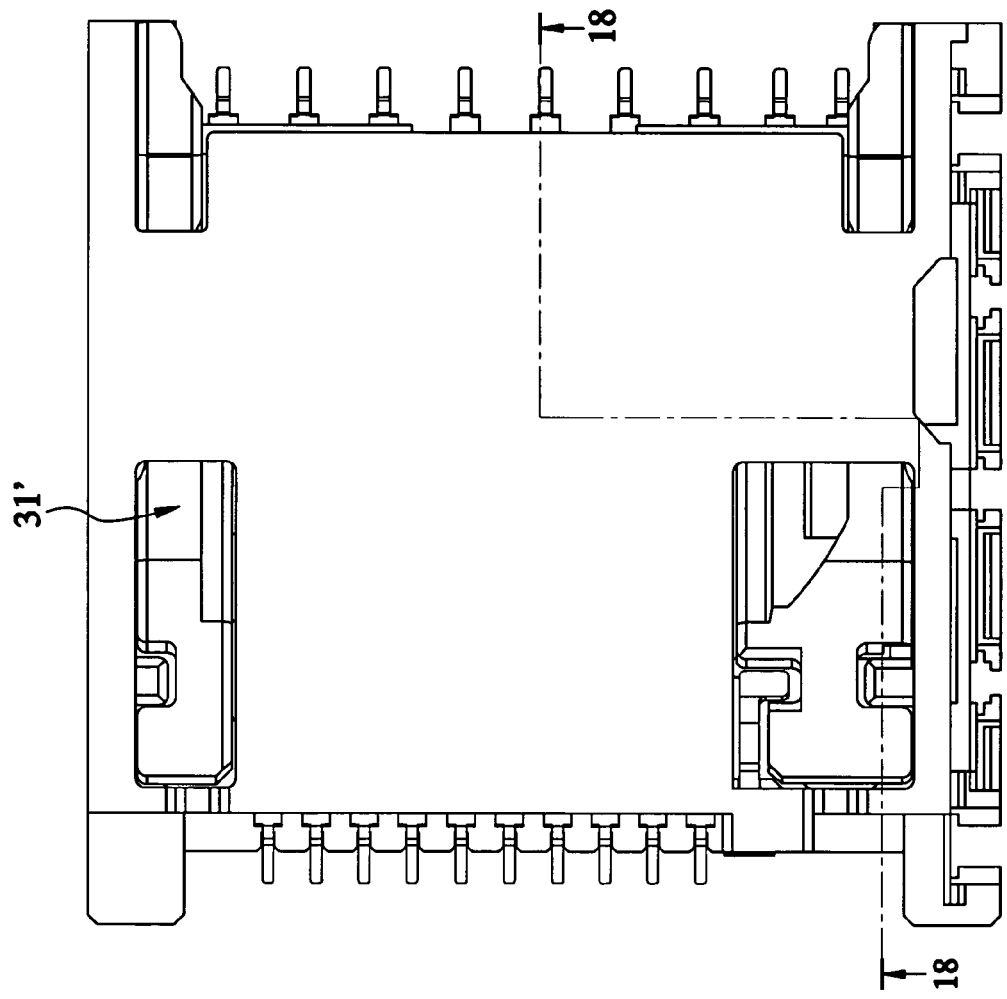
FIG. 17 is a top view of the foolproof multi-card connector in accordance with the second embodiment of the present invention.
Figure 18:
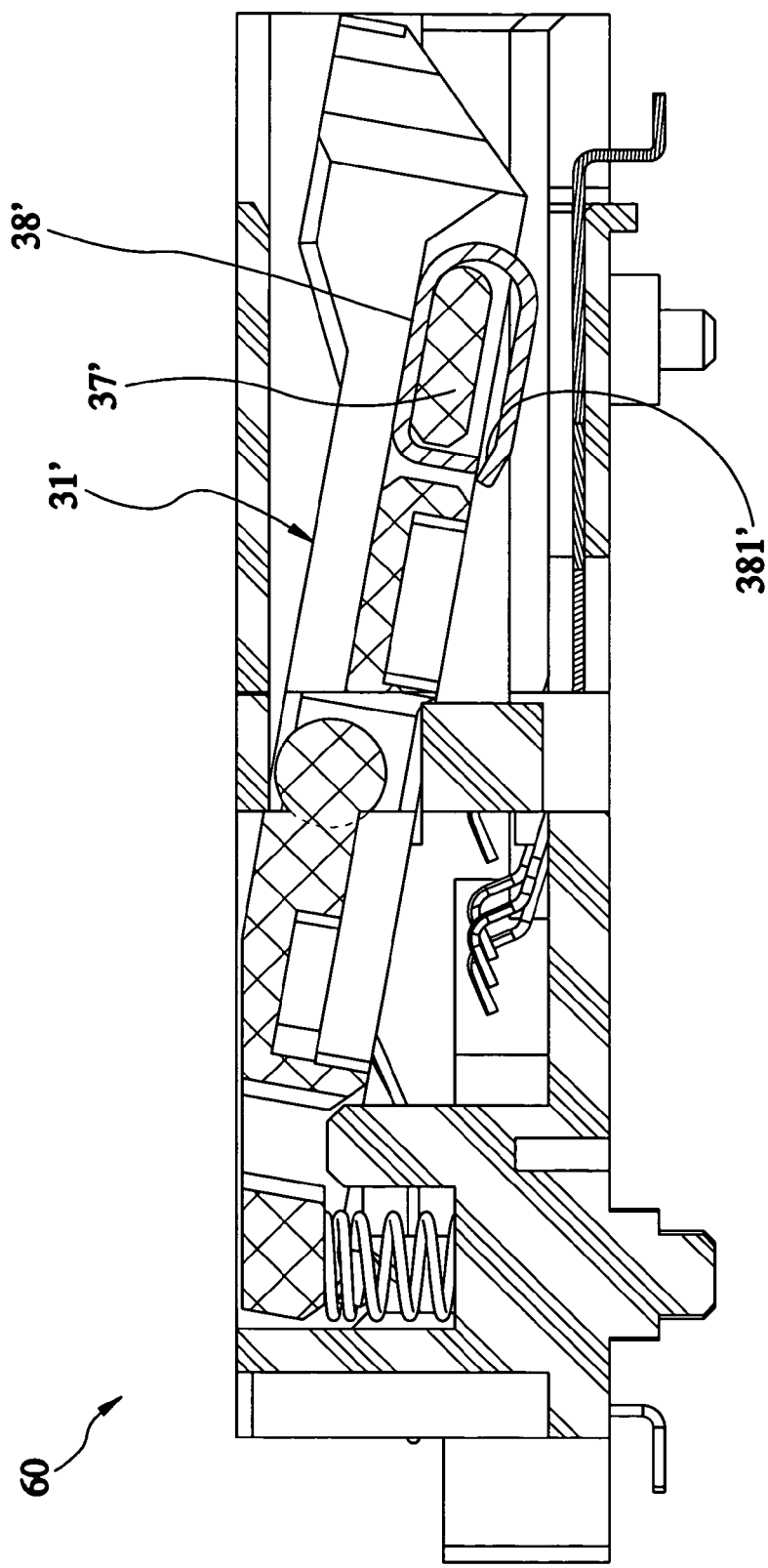
FIG. 18 is a sectional view taken along line 18-18 of FIG. 17.

Insertion of a MS-Duo card 92 is outlined hereinafter. As shown in FIGS. 11 and 12, because the width of a MS-Duo card 92 is shorter than a SD card 91 (see FIG. 7), inserting a MS-Duo card 92 into the housing 11 will cause the front edge of the MS-Duo card 92 to touch the inner guide face 352 of each of the guide blocks 35 and the transverse guide face 36 of the movable partition board 31 and then be guided by the inner guide faces 352 and the transverse guide face 36 to the space above the movable partition board 31. When inserting the MS-Duo card 92 into the bottom side in the insertion hole 12, the MS-Duo card 92 will touch the front edge of the movable partition board 31 and guided toward the space above the movable partition board 31, preventing an error of insertion. When keep inserting the MS-Duo card 92 forwards, as shown in FIG. 13, the movable partition board 31 will be biased to lower its rear side to keep the top wall in horizontal. At this time, the elevation of the movable partition board 31 is lowered, and the space above the movable partition board 31 becomes sufficient for the insertion of the MS-Duo card 92. At this time, as shown in FIG. 14, the two spring members 51 are compressed, the two pivots 32 are respectively positioned in the bottom side inside the sliding grooves 15, and the hook hole 342 (see FIG. 4) is moved downwardly away from the hook portion 42, however the locating grooves 341 are kept coupled to the respective locating ribs 141 to prohibit falling of the movable partition board 31 out of the housing 11. After insertion of the MS-Duo card 92 into the foolproof multi-card connector in position, the movable partition board 31 is kept in the relatively lower position inside the housing 11, and therefore the space beneath the movable partition board 31 is insufficient for the insertion of a SD card 91. If a user inserts a SD card 91 into the housing 11, the SD card 91 will be stopped by the movable partition board 31, preventing an error.

When wishing to remove the inserted MS-Duo card 92, the user can directly pull the MS-Duo card 92 out of the housing 11. After removal of the MS-Duo card 92, the movable partition board 31 is immediately returned to the position before insertion of a card member.

FIGS. 15-18 show a foolproof multi-card connector 60 in accordance with a second embodiment of the present invention. This second embodiment is substantially similar to the aforesaid first embodiment with the exception of the features described hereinafter.

The movable partition board 31' comprises a bridge 37' located on the middle and a movable stop member 38' loosely mounted around the bridge 37'. According to this embodiment, the movable stop member 38' is shaped like a split loop, having a split 381'. By means of opening the split 381', the movable stop member 38' can be conveniently mounted on the bridge 37'. Further, the loop-like movable stop member 38' has a vertical height greater than the vertical thickness of the bridge 37' so that the movable stop member 38' can be moved vertically relative to the bridge 38'.

The use of this second embodiment is substantially similar to the aforesaid first embodiment with exception of the functioning of the movable stop member 38'. The functioning of the movable stop member 38' is explained hereinafter.

Figure 19:
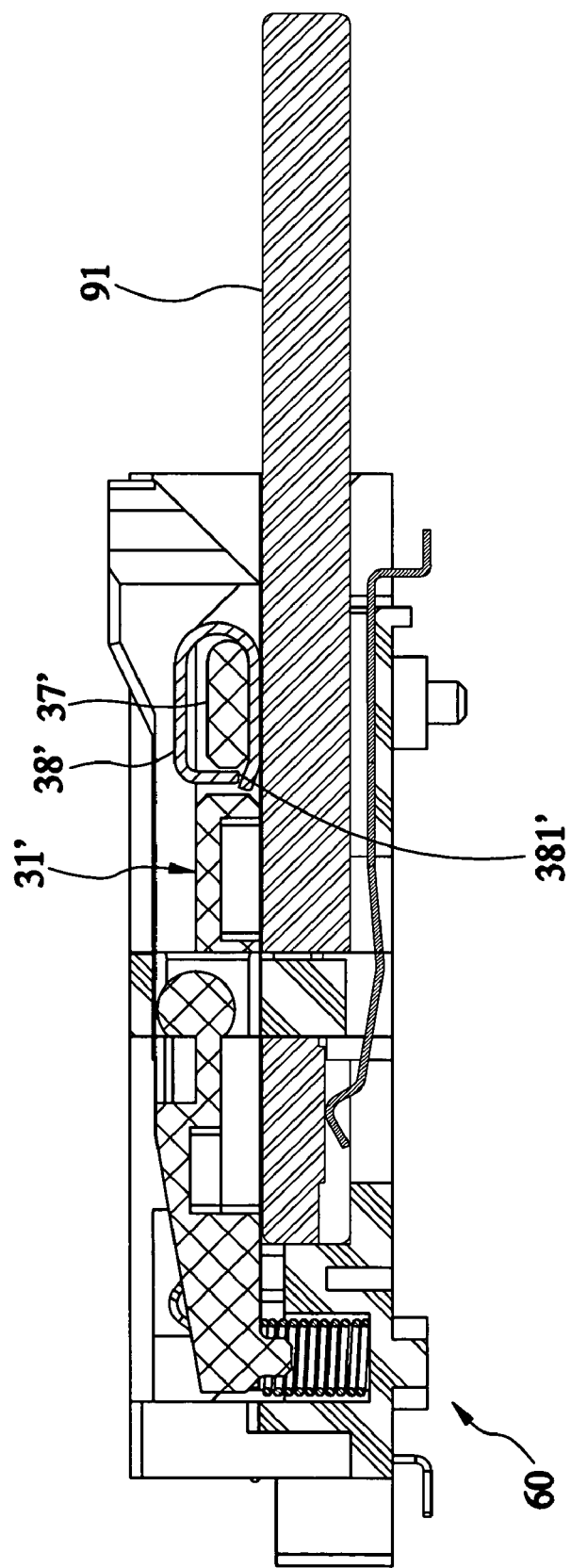
FIG. 19 is a schematic sectional view of the second embodiment of the present invention, showing the positioning of the movable stop member after insertion of a SD card.

As shown in FIG. 19, when inserting a SD card 91 into the connector 60, the movable stop member 38' is moved upwards to interfere with the space above the movable partition board 31'. As explained in the description of the operation of the aforesaid first embodiment, the space above the movable partition board 31' is insufficient for the insertion of a MS-Duo card 92 after insertion of the SD card 91 into the connector 60. According to this second embodiment, upward movement of the movable stop member 38' does not hinder the insertion of the MS-Duo card 92.

Figure 20:
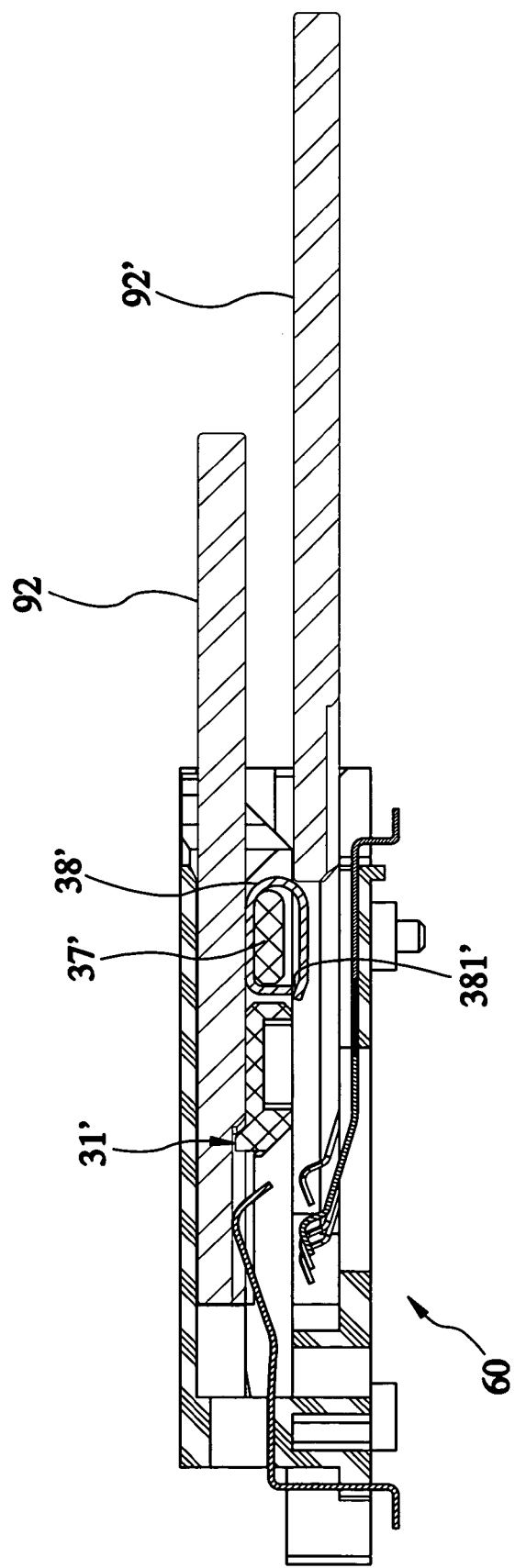
FIG. 20 is a schematic sectional view of the second embodiment of the present invention, showing the positioning of the movable stop member after insertion of a MS-Duo card.

As shown in FIG. 20, after insertion of the MS-Duo card 92, the movable stop member 38' is kept in the lower side to interfere with the space beneath the movable partition board 31'. As explained in the description of the operation of the aforesaid first embodiment, the space beneath the movable partition board 31' is insufficient for the insertion of a SD card 91 after insertion of MS-Duo card 92 into the connector 60. According to this second embodiment, interference of the movable stop member 38' with the space beneath the movable partition board 31' provides no further effect to prohibit insertion of the SD card 91, however it prevents insertion of another MS-Duo card 92 into the space beneath the movable partition board 31'.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A foolproof multi-card connector, comprising:

a housing, said housing comprising an insertion hole defined at a front side thereof, an internal card-insertion chamber in communication with said insertion hole and a sliding groove located on each of two opposite sidewalls of said internal card-insertion chamber;

at least two sets of metal terminals mounted in said housing and projecting into said internal card-insertion chamber;

a movable partition board movably mounted in said internal card-insertion chamber of said housing to divide said internal card-insertion chamber into two vertically spaced spaces, said movable partition board comprising two pivots respectively extended from two opposite lateral sides thereof on the middle and respectively inserted into the sliding grooves of said housing and movable up and down relative to the sliding grooves for enabling said movable partition board to be biased relative to said housing and two guide blocks respectively disposed at a front side of each of two opposite lateral sides thereof, each said guide block comprising a bottom guide face disposed at a bottom side thereof and sloping upwardly forwards and an inner guide face disposed an inner side and sloping outwardly forwards;

a hook member mounted inside said housing and hooked on said movable partition board to prohibit backward displacement along said sliding grooves; and at least one spring member mounted in said housing and supported between an inside bottom wall of said housing and a rear part of said movable partition board to hold said movable partition board in a rear up and front down position.

2. The foolproof multi-card connector as claimed in claim 1, wherein the two sliding grooves of said housing extend in direction from the front side of said housing toward a rear side of said housing to a middle part of each of the two opposite sidewalls of said internal card-insertion chamber respectively.

3. The foolproof multi-card connector as claimed in claim 1, wherein said movable partition board comprises a transverse guide face located on a front side thereof and sloping downwardly forwards.

4. The foolproof multi-card connector as claimed in claim 1, wherein said movable partition board comprises two actuation arms respectively located on the two opposite lateral sides, each said actuation arm having a top edge disposed above the elevation of said movable partition board; said two guide blocks are respectively located on a front side of each of said two actuation arms.

5. The foolproof multi-card connector as claimed in claim 4, wherein said housing comprises two locating ribs respectively protruded from the two opposite sidewalls of said internal card-insertion chamber near a rear side and spaced from a top wall of said internal card-insertion chamber at a predetermined distance through which said two actuation arms of said movable partition board pass when said movable partition board is held in a rear up and front down position; each said actuation arm comprises a locating groove located on an outer side of a rear end thereof for receiving said locating ribs of said movable partition board when said movable partition board is biased to lower the rear side thereof.

6. The foolproof multi-card connector as claimed in claim 4, wherein said hook member is a leaf spring affixed to a rear side inside said housing, having a front end terminating in a hook portion, said hook portion having a front face sloping downwardly forwards; one said actuation arm comprises a hook hole for receiving said hook portion of said hook member.

7. The foolproof multi-card connector as claimed in claim 4, wherein said housing comprises two top openings bilaterally disposed at the front side thereof; each said guide block has a top edge disposed above the elevation of said actuation arms; said guide blocks partially extend through said two openings to the outside of said housing when said movable partition board is kept in the rear down and front up position.

8. The foolproof multi-card connector as claimed in claim 1, wherein said movable partition board comprises an opening on the middle of the rear side thereof; said sets of metal terminals are set corresponding to the opening of said movable partition board.

9. The foolproof multi-card connector as claimed in claim 1, wherein said movable partition board comprises a movable stop member mounted thereon and movable up and down by an external force.

10. The foolproof multi-card connector as claimed in claim 9, wherein said movable partition board comprise a bridge located on a middle part thereof; said movable stop member is shaped like a loop and mounted around said bridge and movable upwards relative to said bridge upon insertion of a card.

11. The foolproof multi-card connector as claimed in claim 10, wherein said movable stop member is formed of a split loop having a split.

* * * * *